(12) United States Patent
Nakagawa et al.

(10) Patent No.: US 11,836,814 B2
(45) Date of Patent: Dec. 5, 2023

(54) HYDROGEN SHARING NETWORK

(71) Applicant: Toyota Motor Engineering & Manufacturing North America, Inc., Plano, TX (US)

(72) Inventors: Masashi Nakagawa, Sunnyvale, CA (US); Makoto Tanaka, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 226 days.

(21) Appl. No.: 17/356,315

(22) Filed: Jun. 23, 2021

(65) Prior Publication Data

US 2022/0414797 A1 Dec. 29, 2022

(51) Int. Cl.

| | |
|---|---|
| *G06Q 50/06* | (2012.01) |
| *H01M 16/00* | (2006.01) |
| *H01M 8/04313* | (2016.01) |
| *G06Q 30/018* | (2023.01) |
| *G06Q 30/0283* | (2023.01) |
| *H04L 9/32* | (2006.01) |
| *H04L 9/30* | (2006.01) |
| *H02J 3/38* | (2006.01) |

(Continued)

(52) U.S. Cl.
CPC ............. *G06Q 50/06* (2013.01); *B60L 53/51* (2019.02); *B60S 5/02* (2013.01); *C25B 1/04* (2013.01); *G01C 21/3407* (2013.01); *G06Q 30/0185* (2013.01); *G06Q 30/0283* (2013.01); *H01M 8/04089* (2013.01); *H01M 8/04201* (2013.01); *H01M 8/04313* (2013.01); *H01M 16/003* (2013.01); *H02J 3/381* (2013.01); *H04L 9/30* (2013.01); *H04L 9/32* (2013.01); *H01M 2250/10* (2013.01); *H02J 2300/24* (2020.01); *H02J 2300/30* (2020.01)

(58) Field of Classification Search
CPC ........................... G06Q 30/0283; G06Q 50/06
See application file for complete search history.

(56) References Cited

U.S. PATENT DOCUMENTS 10,059,215 B1 * 8/2018 Haberman ............... B60L 53/66
2004/0205032 A1 * 10/2004 Routtenberg ........... B60L 58/30
429/430

(Continued)

OTHER PUBLICATIONS

Ball, et al., The hydrogen economy—Vision or reality?, Intl. J. Hydrogen Energy, vol. 40, 2015, pp. 7903-7919 (Year: 2015).*

(Continued)

*Primary Examiner* — Daniel Vetter
(74) *Attorney, Agent, or Firm* — SNELL & WILMER LLP (57) ABSTRACT

Methods, systems, and apparatus for an energy or fuel sharing network system. The energy or fuel sharing network system includes an in-house fuel cell apparatus that is coupled or included within a home. The in-house fuel cell apparatus includes a generation and distribution unit. The generation and distribution unit is configured to generate energy or fuel and provide the energy or fuel to a vehicle. The energy or fuel sharing network system includes an energy or fuel sharing platform. The energy or fuel sharing platform includes a processor. The processor is configured to determine a location of the in-house fuel cell apparatus, and provide the location of the in-house fuel cell apparatus to the vehicle or a user device.

13 Claims, 8 Drawing Sheets

(51) Int. Cl.
*G01C 21/34* (2006.01)
*B60L 53/51* (2019.01)
*B60S 5/02* (2006.01)
*H01M 8/04082* (2016.01)
*H01M 8/04089* (2016.01)
*C25B 1/04* (2021.01)

(56) References Cited

U.S. PATENT DOCUMENTS

| | | | | |
|---|---|---|---|---|
| 2008/0195508 | A1* | 8/2008 | Bailey | G06Q 30/0283 |
| | | | | 705/26.1 |
| 2008/0236247 | A1* | 10/2008 | Nojima | B67D 7/145 |
| | | | | 73/23.31 |
| 2011/0213983 | A1* | 9/2011 | Staugaitis | B60L 58/40 |
| | | | | 713/176 |
| 2012/0197693 | A1* | 8/2012 | Karner | B60L 53/31 |
| | | | | 705/14.1 |
| 2015/0094888 | A1* | 4/2015 | Hyde | B60L 53/63 |
| | | | | 701/22 |
| 2019/0255952 | A1* | 8/2019 | Cun | B60L 53/305 |
| 2019/0351783 | A1* | 11/2019 | Goei | B60L 53/63 |
| 2021/0080282 | A1* | 3/2021 | Goei | B60L 53/665 |

OTHER PUBLICATIONS

EVmatch, Host your private EV charger, available at www.evmatch.com/solutions/residential-hosting, WebArchive dated Nov. 1, 2020 (Year: 2020).*

* cited by examiner

HYDROGEN SHARING NETWORK

BACKGROUND

Field

The present disclosure relates to systems, apparatuses and methods for locating and providing the locations of hydrogen generation and distribution centers to users and managing access to the hydrogen generation and distribution centers.

Description of the Related Art

There are many obstacles in developing a hydrogen-powered fuel cell vehicle ("fuel cell vehicle") that runs solely on hydrogen gas, as opposed to a hybrid vehicle or other vehicle that includes an internal combustion engine, which may utilize an existing gas distribution infrastructure. One obstacle is "range anxiety" or the fear that the fuel cell vehicle will run out of hydrogen gas before the fuel cell vehicle reaches a destination or other location where the vehicle may refill their vehicle. Currently, hydrogen distribution centers that refill fuel cell vehicles are very rare. Moreover, in-house hydrogen gas generation and distribution units that provide hydrogen gas to fuel cell vehicles may be owned, managed or controlled by private entities and be designed for individual-use, and so, there is no readily available network of hydrogen gas generation and distribution units to provide fuel to fuel cell vehicles owned by a third-party. Additionally, there is no readily available way to locate and identify where these in-house hydrogen gas generation and distributions units are located to access these in-house hydrogen gas generation and distribution units. Without ready access to a network of hydrogen gas generation and distribution units, "range anxiety" may prevent mainstream adoption of fuel cell vehicles.

Accordingly, there is a need for a system, apparatus and a method for a hydrogen sharing network to connect fuel cell vehicles with hydrogen gas generation and distribution units to decrease range anxiety.

SUMMARY

In general, one aspect of the subject matter described in this disclosure may be embodied in an energy or fuel sharing network system. The energy or fuel sharing network system includes an in-house fuel cell apparatus that is coupled or included within a home. The in-house fuel cell apparatus includes a generation and distribution unit. The generation and distribution unit is configured to generate energy or fuel and provide the energy or fuel to a vehicle. The energy or fuel sharing network system includes an energy or fuel sharing platform. The energy or fuel sharing platform includes a processor. The processor is configured to determine a location of the in-house fuel cell apparatus, and provide the location of the in-house fuel cell apparatus to the vehicle or a user device.

These and other embodiments may optionally include one or more of the following features. The generation and distribution unit may be a hydrogen gas generation and distribution unit. The hydrogen gas generation and distribution unit may be configured to generate hydrogen gas and may provide the hydrogen gas to the vehicle. The in-house fuel cell apparatus may have a power source and a fuel source. The power source may include at least one of a solar panel or an electrical source. The fuel source may include at least one of a water source or a natural gas source. The hydrogen gas generation and distribution unit may be configured to convert the water source or the natural gas source to hydrogen gas using electrical energy from the power source.

The processor may be configured to determine a second location of a second in-house fuel cell apparatus. The processor may be configured to provide the second location of the second in-house cell apparatus to the vehicle or the user device. The generation and distribution unit may be configured to determine that the vehicle is coupled to the generation and distribution unit. The generation and distribution unit may be configured to authenticate the vehicle using digital key authentication. The generation and distribution unit may be configured to provide the energy or fuel to the vehicle in response to the vehicle being authenticated. The processor may be configured to use public key cryptography to authenticate the vehicle to the generation and distribution unit.

The in-house fuel cell apparatus may include a fuel tank. The fuel tank may be configured to store the fuel. The generation and distribution unit may be configured to determine an amount of fuel stored in the fuel tank. The generation and distribution unit may be configured to provide an availability of the in-house fuel cell apparatus to the energy or fuel sharing platform based on the amount of fuel stored in the fuel tank. The processor of the energy or fuel sharing platform may be configured to obtain a current location of the vehicle. The processor may be configured to obtain the availability of the in-house fuel cell apparatus. The processor may be configured to provide the availability of the in-house fuel cell apparatus and a route from the current location of the vehicle to the location of the in-house fuel cell apparatus to the vehicle or the user device.

The energy or fuel sharing network system may include at least one of multiple user devices or multiple vehicles. The multiple user devices may include the user device. The multiple vehicles may include the vehicle. The multiple user devices or the multiple vehicles may be configured to receive multiple locations of in-house fuel cell apparatuses that include the location of the in-house fuel cell apparatus. The multiple user devices or the multiple vehicles may be configured to display the multiple locations of the in-house fuel cell apparatuses on a map. The multiple user devices or the multiple vehicles may be configured to provide an availability for each of the in-house fuel cell apparatuses. The multiple user devices or the multiple vehicles may be configured provide a price for one or more of the in-house fuel cell apparatuses.

In another aspect, the subject matter may be embodied in a hydrogen sharing platform. The hydrogen sharing platform includes a memory. The memory is configured to store multiple locations of multiple in-house fuel cell apparatuses. The multiple in-house fuel cell apparatuses each have a hydrogen gas generation and distribution unit that is configured to generate hydrogen gas and provide the hydrogen gas to a vehicle. The hydrogen sharing platform includes a processor coupled to the memory. The processor is configured to determine the multiple locations of the multiple in-house fuel cell apparatuses. The processor is configured to provide the multiple locations of the multiple in-house fuel cell apparatuses to a user device or a vehicle.

In another aspect, the subject matter may be embodied in a method. The method includes determining, by a processor of a hydrogen sharing platform, a location of an in-house fuel cell apparatus that has a hydrogen gas generation and distribution unit. The method includes providing, by the processor of the hydrogen sharing platform, the location of the in-house fuel cell apparatus to a vehicle or a user device. The method includes determining, by the processor, that the vehicle is coupled to the hydrogen gas generation and distribution unit. The method includes providing, by the hydrogen gas generation and distribution unit, hydrogen gas to the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, apparatus and methods for locating and providing the locations of one on more in-house fuel cell apparatuses that may refuel or recharge a vehicle. Particular embodiments of the subject matter described in this disclosure may be implemented to realize one or more of the following advantages. The energy or fuel sharing network (or "fuel sharing network"), such as a hydrogen gas sharing network, locates, identifies and provides the locations of in-house fuel cell apparatuses that have an energy or fuel generation and distribution unit, such as a hydrogen gas generation and distribution unit, to vehicles, such as fuel cell vehicles, and/or users. The in-house fuel cell apparatuses may be located in residential homes or other privately-owned infrastructure and may be utilized to allow access to vehicles owned by other parties to provide energy or fuel, such as electrical energy or hydrogen gas, to the vehicles owned by other parties. The fuel sharing network may have an energy or fuel sharing platform (or "fuel sharing platform"). The fuel sharing platform may aggregate the locations of these in-house fuel cell apparatuses and provide the locations of these in-house fuel cell apparatuses to vehicles, such as fuel cell vehicles, so that the vehicles may access and refill fuel at these in-house fuel cell apparatuses. This expands access to fuel distribution centers and matches vehicles with the nearest fuel distribution center.

Other benefits and advantages include the capability to facilitate secure access and distribution of the fuel or energy from the in-house fuel cell apparatus to the vehicle. The fuel sharing network facilitates the secure access and distribution of the fuel or energy from the in-house fuel cell apparatus to the vehicle using digital key authentication. By implementing digital key authentication, the fuel sharing network ensures that the vehicle is authenticated with the in-house fuel apparatus so that there is no unauthorized access to the in-house fuel cell apparatus.

Additionally, the fuel sharing network may provide additional information regarding the in-house fuel cell apparatus. The additional information may include the price and availability of the fuel that is being provided. Moreover, the fuel sharing network may route the vehicle to the nearest or selected in-house fuel cell apparatus, which assists the driver to navigate to the in-house fuel cell apparatus.

Figure 1:
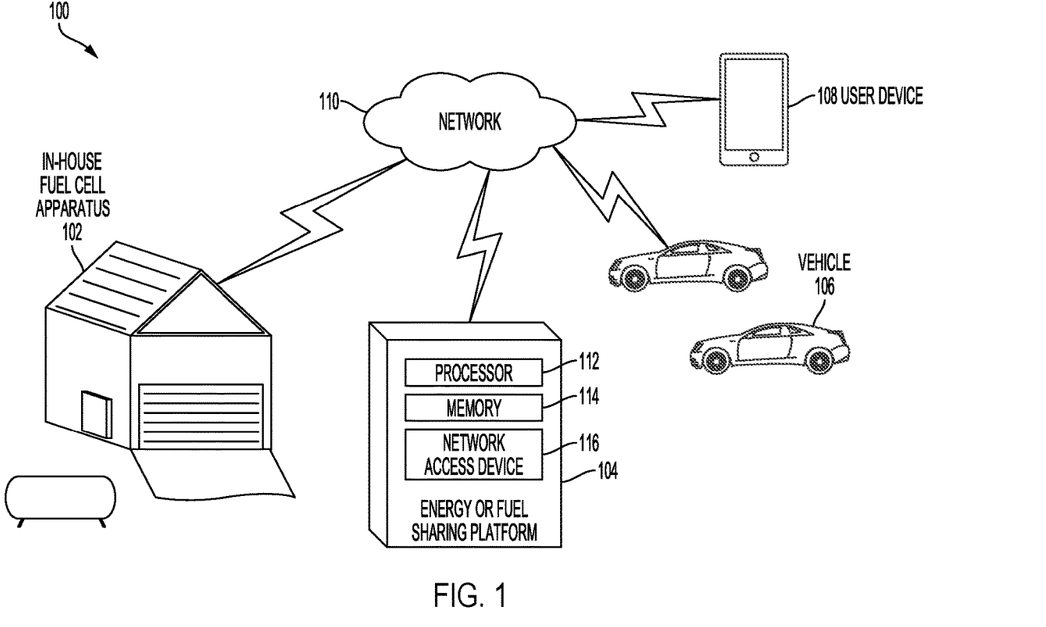
FIG. 1 is a block diagram of an example energy or fuel sharing network system according to an aspect of the invention.

FIG. 1 is an energy or fuel sharing network system (or "fuel sharing network") 100. The fuel sharing network 100 may be a hydrogen gas sharing network that identifies and provides locations for hydrogen gas generation and distribution centers. The fuel sharing network 100 may be another type of energy or fuel sharing network, such as an electrical energy or other fuel sharing network that identifies and provides locations for electrical energy charging stations or other fuel distribution centers.

The fuel sharing network 100 may couple, connect to, or include one or more other devices or entities. The one or more other devices or entities may include one or more in-house fuel cell apparatuses 102, an energy or fuel sharing platform 104, one or more vehicles 106 and/or one or more user devices 108. The fuel sharing network 100 may have a network 110 that couples and/or connects the devices and entities together allowing for communication amount different devices or entities within the fuel sharing network 100.

The network 110 links the multiple devices and/or entities to share information. The network 110 may be a Dedicated Short-Range Communication (DSRC) network, a local area network (LAN), a wide area network (WAN), a cellular network, the Internet, or combination thereof, that connects, couples and/or otherwise communicates among the multiple devices and/or entities.

The fuel sharing network 100 includes an energy or fuel sharing platform (or "fuel sharing platform") 104. The fuel sharing platform 104 may be a remote computing device or server that collects, aggregates or otherwise obtains the locations of one or more in-house fuel cell apparatuses 102 and shares, distributes or provides the locations of the one or more in-house fuel cell apparatuses 102 to one or more vehicles 106 and/or one or more user devices 108. The fuel sharing platform 104 may be a hydrogen gas sharing platform that specializes in locating in-house fuel cell apparatuses that provide hydrogen gas to a fuel cell vehicle.

The fuel sharing platform 104 may obtain other information from the one or more in-house fuel cell apparatuses 102, such as the availability of the in-house fuel cell apparatus 102 and share that information with the one or more vehicles 106 and/or user devices 108. Moreover, the fuel sharing platform 104 may obtain information from the one or more vehicles 106 and/or one or more user devices 108 or other in-house fuel cell apparatus 102 and share the information with the in-house fuel cell apparatus 102, the one or more user devices 108 and/or the one or more other vehicles 106.

The fuel sharing platform 104 may include a processor 112, a memory 114 and/or a network access device 116 to perform the functions described above. The processor 112, the memory 114 and the network access device 116 are further described below. The processor 112 executes instructions stored within the memory 114 to process requests for locations and to provide the locations of the one or more in-house fuel cell apparatuses 102. The processor 112 shares the information of the in-house fuel cell apparatuses 102 with the other devices and/or entities. The network access device 116 couples the fuel sharing platform 104 to the network 110 so that the fuel sharing platform 104 communicates with the other devices and/or entities.

The fuel sharing network 100 includes one or more in-house fuel cell apparatuses 102. The fuel sharing network 100 may include multiple in-house fuel cell apparatuses 102. Each of the one or more in-house fuel cell apparatuses 102 may be included, located or positioned within a building, such as a residential home, office building or other infrastructure, and may provide generation and distribution capabilities for electrical charging or refueling of fuel, such as hydrogen gas. The fuel-cell apparatus 102 may be coupled to the other devices and/or entities, such as the fuel sharing platform 104, the vehicle 106 and/or the one or more user devices 108. The in-house fuel cell apparatus 102 is further described below in reference to FIG. 2, for example.

The fuel sharing network 100 may include one or more vehicles 106. A vehicle 106 is a conveyance capable of transporting a person, an object, or a permanently or temporarily affixed apparatus. The vehicle 106 may be a self-propelled wheeled conveyance, such as a car, sports utility vehicle, truck, bus, van or other motor, battery or fuel cell driven vehicle. For example, the vehicle 106 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 106 may be semi-autonomous or autonomous. The vehicle 106 may have one or more components that interact with the fuel sharing platform 104, the one or more in-house fuel cell apparatuses 102 and/or the one or more user devices 108. The components of the vehicle 106 are further described below in reference to FIG. 3, for example.

The fuel sharing network 100 may include one or more user devices 108. The user device 108 may be a personal device, a tablet, a personal computer, a wearable device or other device. The user device 108 may have one or more components, such as a processor 402, a memory 408, a network access device 404 and/or a user interface 406 or other components, which are described in further detail in reference to FIG. 4, for example. The one or more other components may include a navigation unit 410.

Figure 2:
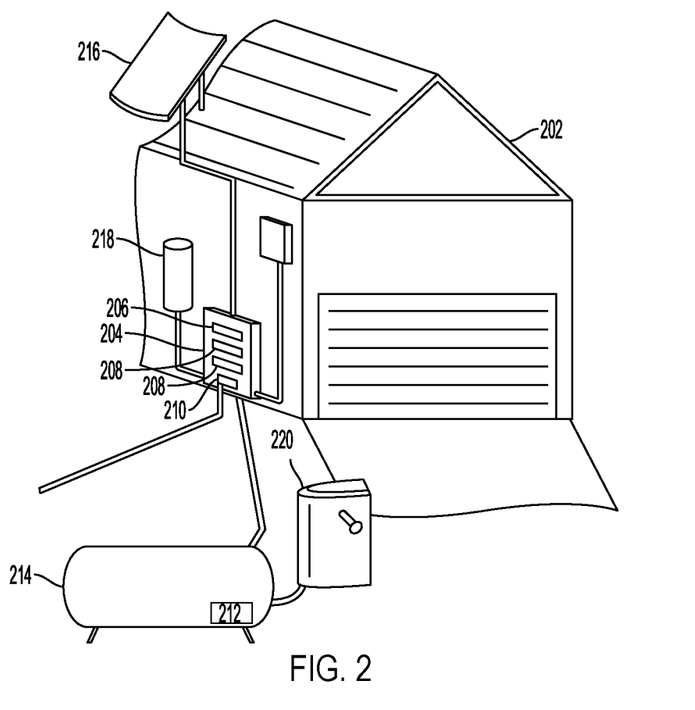
FIG. 2 shows an example in-house fuel cell apparatuses of the energy or fuel sharing network system of FIG. 1 according to an aspect of the invention.

FIG. 2 shows an in-house fuel cell apparatus 102. The fuel sharing network 100 may have one or more in-house fuel cell apparatuses 102, e.g., a single in-house fuel cell apparatus 102 or multiple in-house fuel cell apparatuses 102. The in-house fuel cell apparatus 102 may be positioned, coupled to or connected to or included as part of an infrastructure, such as a residential home or business (hereinafter, "housing unit") 202. The in-house fuel cell apparatus 102 includes a generation and distribution unit 204, a power source 216, a fuel source 218 and/or a fuel tank 214.

The generation and distribution unit 204 generates energy or fuel and provides or distributes the energy or fuel to the one or more vehicles 106. The generation and distribution unit 204 may be a hydrogen gas generation and distribution unit 204 that distributes hydrogen gas to the one or more vehicles 106, such as a fuel cell vehicle. In some implementations, the generation and distribution unit 204 may be an electrical charging unit that provides electrical energy to an electric vehicle. The generation and distribution unit 204 may generate and distribute energy and/or some type of fuel. The generation and distribution unit 204 may authenticate the one or more vehicles 106 using digital key authentication and provide the energy or fuel once the one or more vehicles 106 are connected and authenticated to the generation and distribution unit 204.

The generation and distribution unit 204 may include one or more processors 206, a memory 208, a network access device 210, one or more sensors 212 and an outlet 220. The one or more processors 206 may execute instructions stored in the memory 208 to provide statistics of the amount of fuel and/or energy that is available to provide to the one or more vehicles 106. The one or more processors 206 may determine the availability of the generation and distribution unit 204, the price of the fuel and/or energy, and/or provide the capability to authenticate the one or more vehicles 106. The network access device 210 may couple the generation and distribution unit 204 with the other devices and/or entities of the fuel sharing network 100.

The generation and distribution unit 204 may include one or more sensors 212 and an outlet 220. The one or more sensors 212 may include a sensor that detects or measures an amount of energy or fuel stored in a battery or a fuel tank 214, respectively, or other energy or fuel storage container. The one or more sensors 212 may measure the amount and/or rate of energy of fuel stored, remaining, flowing in and/or out of the fuel storage container. One or more sensors 212 may also measure or detect the amount of energy or fuel being used from the electrical source, fuel source and/or power source. The outlet 220 may be coupled to or included as part of the generation and distribution unit 204 and be used to couple to the one or more vehicles 106 to deliver the energy and/or fuel.

The in-house fuel cell apparatus 102 includes a power source 216 and a fuel source 218. The power source 216 may be a solar panel or other electrical source that provides energy to convert the fuel source to fuel using electrical energy from the power source 216. Other electrical sources may include the electrical power grid, wind panels or other renewable or nonrenewable energy sources. The fuel source 218 may be water or natural gas provided via a water line, gas line, water tank, gas tank or other fuel source. The generation and distribution unit 204 may couple to the power source 216 and/or the fuel source 218 and use the electrical energy from power source 216 to convert the fuel from the fuel source into hydrogen gas or other fuel to provide to the one or more vehicles 106 and power the one or more vehicles 106. For example, electrical power from converted from a solar panel may be used to convert the water or natural gas into hydrogen gas for a fuel cell vehicle.

The in-house fuel cell apparatus 102 may include a fuel tank 214 or other storage container. The storage container may be a battery that stores electrical energy to charge and/or distribute to an electrical vehicle. The fuel tank 214 may store and contain fuel, such as hydrogen gas. The fuel tank 214 may store and contain the fuel for distribution to the one or more vehicles 106. One or more sensors 212 may measure the amount of electrical energy stored in the battery, the fuel tank 214 and/or other storage container.

Figure 3:
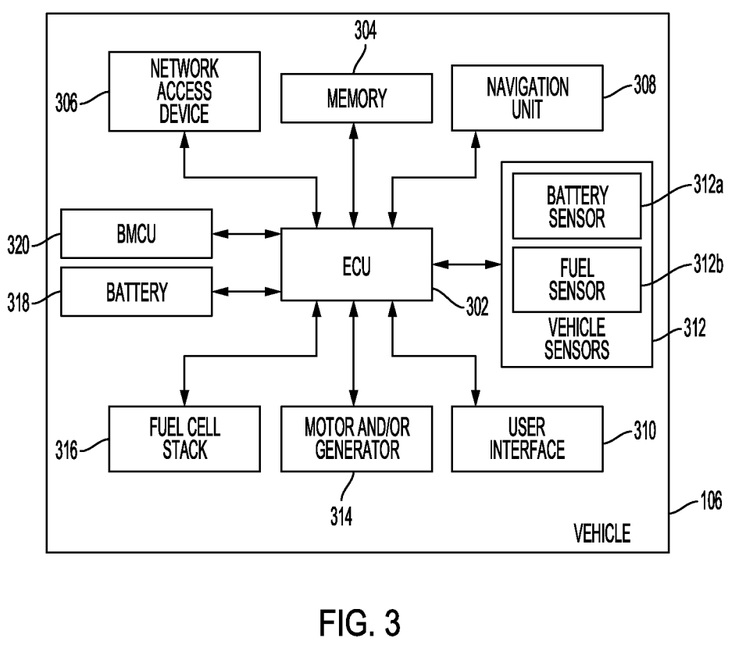
FIG. 3 is a block diagram of a vehicle of the energy or fuel sharing network system of FIG. 1 according to an aspect of the invention.

FIG. 3 shows a block diagram of the one or more vehicles 106 that are included within the fuel sharing network 100. The one or more vehicles 106 may include one or more processors, such as an electronic control unit (ECU) 302, a memory 304, a network access device 306, a navigation unit 308, a user interface 310 and/or one or more vehicle sensors 312. The one or more vehicles 106 may include other components. The other components may include a motor and/or generator 314, a fuel cell stack 316, a battery 318, and/or a battery management and control unit (BMCU) 320.

The ECU 302 of the one or more vehicles 106 may execute instructions stored in the memory 304 to provide status information of the vehicle 106, such as an amount of fuel or energy that remains, provide information to the driver or other occupants via the user interface 310, such as the locations of the one or more in-house fuel cell apparatuses 102, and/or determine a route to the location of one of the one or more in-house fuel cell apparatuses 102. The ECU 302 may communicate with one or more of the other devices or entities, e.g., to authenticate the vehicle 106 with the in-house fuel cell apparatus 102. The memory 304 may be coupled to the ECU 302 and store configurations or settings related to the refueling of the vehicle 106, such as determining the location of the one or more in-house fuel cell apparatus 102 to route to.

The network access device 306 may couple the one or more vehicles 106 with the other devices and/or entities. The network access device 306 allows the ECU 302 to communicate data to and/or from the one or more vehicles 106 to the in-house apparatus 102, the user device 108 and/or the fuel sharing platform 104. The navigation unit 308 may be integral to the vehicle 106 or a separate unit coupled to the vehicle 106, such as the user device 108 with navigation capabilities. When the navigation unit 308 is separate from the vehicle 106, the navigation unit 308 may communicate with the vehicle 106 via the network access device 306. The vehicle 106 may include a Global Positioning System (GPS) unit (not shown) for detecting location data including a current location of the vehicle 106 and/or date/time information. In that regard, the ECU 302 may perform the functions of the navigation unit 308 based on data received from the GPS unit. At least one of the navigation unit 308 or the ECU 302 may predict or propose a route set that includes a starting location and a destination location. The navigation unit 308 or the ECU 302 may perform navigation functions. Navigation functions may include, for example, route and route set predictions, providing navigation instructions, and receiving user input such as verification of predicted routes and route sets or destinations. Other information, such as a current speed of the vehicle 106, may be extrapolated, interpreted, or otherwise calculated from the data obtained from the navigation unit 308.

The navigation unit 308 may provide and obtain navigational map information. The navigational map information may include a current location, a starting location, a destination location and/or a route between the starting location or current location and the destination location of the vehicle 106, and may include a memory (not shown) for storing route data. The navigation unit 308 may receive data from other sensors capable of detecting data corresponding to location information. For example, the other sensors may include a gyroscope or an accelerometer.

In some implementations, the navigational map information includes map data. The map data includes locations of one or more roadways, places of interest, structures, terrain features or other places of interest. The map data includes one or more locations of one or more in-house fuel cell apparatuses 102. The map data may also include the availability of the one or more locations of the one or more in-house fuel cell apparatuses 102 and/or other information related to the one or more in-house fuel cell apparatuses 102.

The one or more vehicle sensors 312 may include one or more battery sensors 312a and/or one or more fuel sensors 312b. The one or more battery sensors 312a may measure the amount of electrical charge in the battery 318 and/or the rate of charging or discharging of the battery 318. The one or more fuel sensors 312b may measure the amount of fuel in the fuel tank, such as the amount of hydrogen in a hydrogen gas fuel tank within the vehicle 106. The one or more fuel sensors 312b may measure the amount of inflow or outflow of the fuel into or out of the fuel tank.

The vehicle 106 may include a user interface 310. The user interface 310 may receive the locations of the one or more in-house fuel cell apparatuses 102 and display the locations of the one or more in-house fuel cell apparatuses 102 on a display of the user interface 310. The user interface 310 may also receive user input or selections from occupants of the vehicle 106, which may include parameters, requirements, configurations or settings that filter or identify the location of a desired in-house fuel cell apparatus 102. Moreover, the route of the vehicle 106, e.g., the route to the location of the desired in-house fuel cell apparatus 102 may be shown on the display of the user interface 310.

The vehicle 106 include one or more other vehicle components. The one or more vehicle components may include a motor and/or generator 314. The motor and/or generator 314 may convert electrical energy into mechanical power, such as torque, and may convert mechanical power into electrical energy. The motor and/or generator 314 may be coupled to the battery 318. The motor and/or generator 314 may convert the energy from the battery 318 into mechanical power, and may provide energy back to the battery 318, for example, via regenerative braking. In some implementations, the vehicle 106 may include one or more additional power generation devices such as the engine (not shown) or a fuel cell stack 316. The engine combusts fuel to provide power instead of and/or in addition to the power supplied by the motor and/or generator 314. The fuel cell stack 316 generates electricity in the form of direct current (DC) from electro-chemical reactions that take place in a fuel cell.

The battery 318 may be coupled to the motor and/or generator 314 and may provide electrical energy to and receive electrical energy from the motor and/or generator 314. The battery 318 may include one or more rechargeable batteries.

The BMCU 320 may be coupled to the battery 318 and may control and manage the charging and discharging of the battery 318. The BMCU 320, for example, may measure, using battery sensors, parameters used to determine the state of charge (SOC) of the battery 318. The BMCU 320 may control the battery 318 to maintain a reserve power explicitly for providing a sudden burst of electrical energy to be converted into power for the transmission to drive or move the multiple wheels of the vehicles 106.

Figure 4:
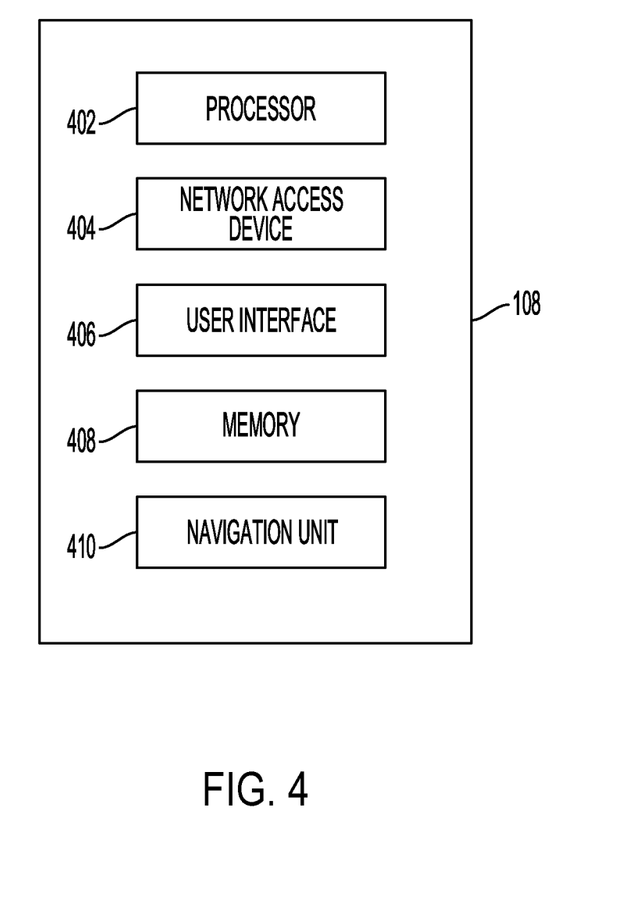
FIG. 4 is a block diagram of a user device of the energy or fuel sharing network system of FIG. 1 according to an aspect of the invention.

FIG. 4 shows a block diagram of one or more user devices 108. The one or more user devices 108 may include one or more processors 402, a network access device 404, a user interface 406, a memory 408 and/or a navigation unit 410. The one or more processors 402 of the user device 108 may execute instructions, such as a software application, that is stored in the memory 408 to provide the locations of the one or more in-house fuel cell apparatuses 102. The one or more processors 402 may receive selections or user input from the user via the user interface 406, render on a display of the user interface 406 the locations of one or more in-house fuel cell apparatuses 102 or a route to the location of one of the one or more in-house fuel cell apparatuses 102, and/or process requests from the user to obtain the locations of the one or more in-house fuel cell apparatuses 102. The user device 108 may use the network access device 404 to couple and communicate with one or more of the other devices or entities via the network 110. The user device 108 may use the navigation unit 410 to obtain a current location of the user device 108 and/or provide routing information for the user device 108.

The one or more processors 112, 206, 402 and/or the ECU 302 may each be implemented as a single processor or as multiple processors. The one or more processors 112, 206, 402 and/or the ECU 302 may be electrically coupled to, connected to or otherwise in communication with the corresponding memory 114, 208, 408, 304, respectively, and/or network access devices 116, 210, 404, 306, respectively, and/or user interfaces 310, 406 on the respective device, such as the fuel sharing platform 104, the one or more in-house fuel cell apparatuses 102, the one or more vehicles 106 and/or the one or more user devices 108.

The one or more memories 114, 208, 408, 304 may be coupled to the one or more processors 112, 206, 402 and/or ECU 302 and store instructions that the processors 112, 206, 402 and/or ECU 302 execute. The one or more memories 114, 208, 408, 304 may include one or more of a Random Access Memory (RAM) or other volatile or non-volatile memory. The one or more memories 114, 208, 408, 304 may be a non-transitory memory or a data storage device, such as a hard disk drive, a solid-state disk drive, a hybrid disk drive, or other appropriate data storage, and may further store machine-readable instructions, which may be loaded on and executed by the one or more processor 112, 206, 402 and/or ECU 302.

The network access devices 116, 210, 404, 306 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access devices 116, 210, 404, 306 may transmit data to and receive data from among each other among the devices and/or entities. For example, the ECU 302 may communicate with the fuel sharing platform 104 to obtain a map of locations of various in-house fuel cell apparatuses and their availabilities.

The user interfaces 310, 406 may include an input/output device that receives user input, such as a user interface element, a button, a dial, a microphone, a keyboard, or a touch screen, and/or provides output, such as a display, a speaker, an audio and/or visual indicator, or a refreshable braille display. The user interfaces 310, 406 may receive user input that may include configuration settings or selections of locations of one or more in-house fuel cell apparatuses 102, for example.

Figure 5:
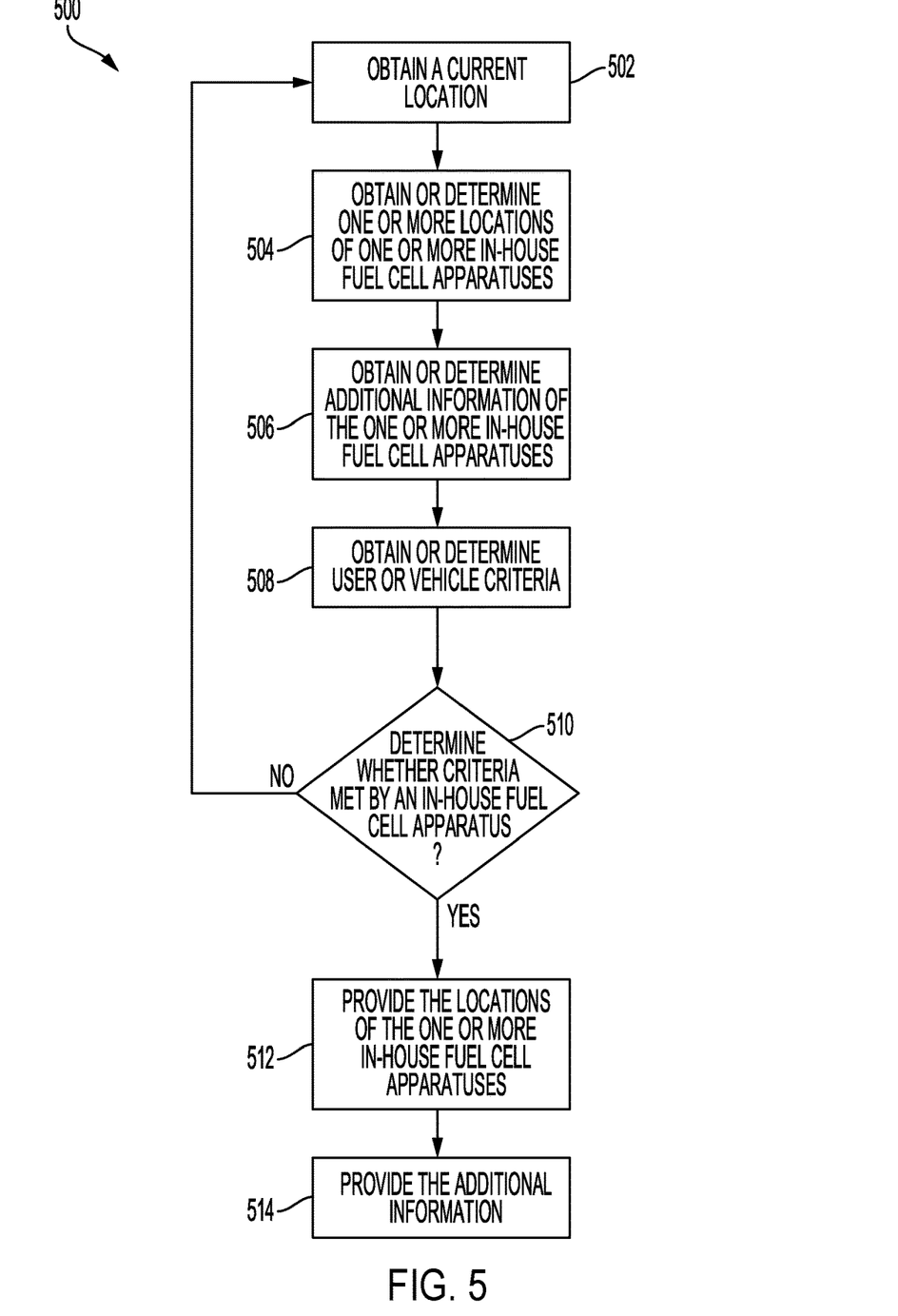
FIG. 5 is a flow diagram of an example process for obtaining and providing locations of one or more in-house fuel cell apparatuses to one or more vehicles and/or to one or more user devices using the energy or fuel sharing network system of FIG. 1 according to an aspect of the invention.

FIG. 5 is a flow diagram of a process 500 for obtaining and providing locations of one or more in-house fuel cell apparatuses 102 to one or more vehicles 106 and/or to one or more user devices 108. One or more computers or one or more data processing apparatuses, for example, the processor 112 of the fuel sharing platform 104, the ECU 302 of the vehicle 106 and/or the processor 402 of the user device 108 of the fuel sharing network 100, appropriately programmed, may implement the process 500.

The fuel sharing platform 104 may connect one or more in-house fuel cell apparatus 102 and one or more vehicles 106 and/or one or more user devices 108 that require fuel or electrical energy. The fuel sharing platform 104 may facilitate the authentication between the in-house fuel cell apparatus 102 and the one or more vehicles 106 that plan to refuel or recharge at a selected or determined in-house fuel cell apparatus 102. Moreover, the fuel sharing platform 104 may share information, such as the availability of the in-house fuel cell apparatus 102, with the one or more vehicles 106 and/or the one or more user devices 108.

The fuel sharing network 100 may obtain a current location of the vehicle 106 and/or the user device 108 (502). The navigation unit 308 of the vehicle 106 and/or the navigation unit 410 of the user device 108 may obtain navigational map information including the current location of the vehicle 106 and/or the user device 108, respectively, and send or transmit the current location to the fuel sharing platform 104. The fuel sharing platform 104 may obtain the current location of the vehicle 106 and/or user device 108 and use the current location to determine one or more in-house fuel cell apparatuses 102 that are in proximity to the current location of the vehicle 106 and/or the user device 108, e.g., within a threshold distance of the current location of the vehicle 106 and/or the user device 108.

The fuel sharing network 100 may obtain or determine one or more locations of one or more in-house fuel cell apparatuses 102 (504). The fuel sharing platform 104 may receive or obtain the one or more locations of the one or more in-house fuel cell apparatuses 102. The fuel sharing platform 104 may receive a beacon or indication from each of the one or more in-house fuel cell apparatuses 102 to identify the one or more locations of the one or more in-house fuel cell apparatuses 102. In some implementations, the fuel sharing platform 104 may have stored the locations of the one or more in-house fuel cell apparatuses 102 in a memory 208 when an owner of a corresponding in-house fuel cell apparatus 102 registers the corresponding in-house fuel cell apparatus 102 with the fuel sharing network 100.

The fuel sharing network 100 may obtain or determine additional information of the one or more in-house fuel cell apparatuses 102 (506). The fuel sharing platform 104 may obtain or determine the additional information of the one or more in-house fuel cell apparatuses 102. The fuel sharing platform 104 may receive the additional information from the one or more in-house fuel cell apparatuses 102. The additional information may include sensor data and/or availability data from the one or more in-house fuel cell apparatuses 102.

The availability data may indicate whether an in-house fuel cell apparatuses 102 is available for the vehicle 106 to connect to the in-house fuel cell apparatus 102. The in-house fuel cell apparatus 102 may be available when the amount of fuel or energy stored by the in-house fuel cell apparatus 102 is greater than or equal to a threshold amount that indicates that there is enough fuel or energy to refill or provide to the vehicle 106 and/or when there is no vehicle 106 attached and/or using the in-house fuel cell apparatus 102 to recharge or refill the vehicle 106. The in-house fuel cell apparatus 102 may be unavailable when the amount of fuel or energy stored by the in-house fuel cell apparatus 102 is less than the threshold amount that indicates that there is enough fuel or energy to refill or provide to the vehicle 106 and/or when there is another vehicle 106 attached and/or using the in-house fuel cell apparatus 102.

The sensor data may include an amount of energy or fuel available from the in-house fuel cell apparatus 102, such as the amount of hydrogen gas in the fuel tank 214 or the amount of electrical energy stored at a charging station. The sensor data may include an estimated time to when the in-house fuel cell apparatus 102 is available, such as the time until a coupled vehicle 106 will be filled or recharged and be able to disengage or disconnect from the in-house fuel cell apparatus 102.

The additional information may include other information, such as a type or kind of in-house fuel cell apparatus 102 and the type or kind of fuel that the in-house fuel cell apparatus 102 distributes or provides. The different types or kinds include an electrical charging station that provides electrical energy or a hydrogen gas generation and distribution unit that provides hydrogen gas. The other information may also include the price per unit of energy for the fuel or energy at the corresponding in-house fuel cell apparatus 102. In some implementations, the owner of an in-house fuel cell apparatus 102 may intentionally raise the price per unit of energy at their own in-house fuel cell apparatus 102 to a higher price in comparison to other available in-house fuel cell apparatuses 102. The owner may fill-up at a neighboring in-house fuel cell apparatus 102 that is less expensive while charging the higher price at their own in-house fuel cell apparatus 102 to earn revenue on the difference between the higher price the owner is charging and the market price.

The fuel sharing network 100 may obtain or determine one or more user or vehicle criteria (or simply referred to as "criteria") (508). The one or more user or vehicle criteria may include one or more user preferences, such as a location with a threshold distance, the type or kind of fuel or energy required by the one or more vehicles 106 and/or a type or kind of fuel or energy desired by a user of the user device 108. Other criteria may include a driving range from the current location of the vehicle 106 and/or a driving range from the current location of the user device 108. The driving range may be determined from sensor data that indicates an amount of fuel or energy remaining in the vehicle 106 along with a rate of the amount of fuel or energy that is being used per distance travelled.

The user interface 406 of the user device 108 and/or the user interface 310 of the vehicle 106 may receive user input that indicates or includes the one or more user or vehicle criteria. The user device 108 and/or the vehicle 106 may provide the one or more user or vehicle criteria to the fuel sharing platform 104 for comparison with the additional information of the one or more in-house fuel cell apparatuses 102 so that the fuel sharing platform 104 may identify one or more locations of the one or more in-house fuel cell apparatuses 102 that meet the user or vehicle criteria.

The fuel sharing network 100 determines whether the user or vehicle criteria are met by the one or more in-house fuel cell apparatuses 102 (510). The fuel sharing platform 104 compares the one or more user or vehicle criteria to the additional information obtained from the one or more in-house fuel cell apparatuses 102 and/or the one or more locations of the in-house fuel cell apparatuses 102.

For example, the fuel sharing platform 104 may compare a user criteria or a vehicle criteria that indicates that an in-house fuel cell apparatus 102 is within a threshold distance, such as an approximately 1 mile, 5 mile or 10 mile radius, is desired. The fuel sharing platform 104 may determine the relative distance between the current location of the vehicle 106 and the locations of the one or more in-house fuel cell apparatuses, compare the relative distance with the user criteria or the vehicle criteria, such as the threshold distance, and determine whether the user criteria or the vehicle criteria is met, e.g., is within the threshold distance.

In another example, the fuel sharing platform 104 may compare a user or a vehicle criteria that indicates that the desired type of energy or fuel is an electrical charge or hydrogen gas to the type of energy or fuel provided by the in-house fuel cell apparatus 102, such as providing an electrical charge or hydrogen gas, respectively. When the type of energy or fuel desired by the user or the vehicle matches the type of energy or fuel provided by the in-house fuel cell apparatus 102, the fuel sharing platform 104 may indicate that the user or vehicle criteria are met.

When the one or more user or vehicle criteria are not met by one or more in-house fuel cell apparatuses 102, the fuel sharing platform 104 may continue to monitor the current location of the vehicle 105 and/or the user device 108 (502). Otherwise, when the one or more user or vehicle criteria are met by the one or more in-house fuel cell apparatuses 102, the fuel sharing platform 104 may provide the locations of the one or more in-house fuel cell apparatuses 102 that meet the one or more user or vehicle criteria (512).

The fuel sharing platform 104 provides the location of the one or more in-house fuel cell apparatuses 102 to the one or more user device 108 and/or the one or more vehicles 106 (512). The one or more user devices 108 and/or the one or more vehicles 106 may display the locations of the one or more in-house fuel cell apparatuses on a rendering of a map on a display of the one or more user interfaces 406, 310. The fuel sharing platform 104 may provide the location of the one or more in-house fuel cell apparatuses 102 that have met the one or more user or vehicle criteria, such as one or more in-house fuel cell apparatuses 102 that are available, and/or may provide all of the one or more in-house fuel cell apparatuses 102 within a threshold distance of the one or more vehicles 106 and/or user device 108 and differentiate between the in-house fuel cell apparatuses 102 that have met the criteria and the in-house fuel cell apparatuses 102 that have not met the criteria. The fuel sharing platform 104 may send the locations via the network access device 116 and over the network 110 to the one or more user devices 108 and/or the one or more vehicles 106.

The fuel sharing platform 104 may provide the additional information to the one or more user devices 108 and/or the one or more vehicles 106 (514). The additional information may include the cost per energy or fuel unit, the amount of fuel or energy remaining at the in-house fuel cell apparatus 102 and/or the availability or estimated time to availability of the in-house fuel cell apparatus 102. The additional information may include other information related to the in-house fuel cell apparatus 102 and its ability to delivery or provide the fuel or energy. By providing the additional information to the one or more user devices 108 and/or one or more vehicles 106, the fuel sharing platform 104 may cause the one or more user interfaces 310, 406 of the one or more user devices 108 and/or the one or more vehicles 106 to display the additional information alongside the locations of the one or more in-house fuel cell apparatuses 102 that have met the criteria. In some implementations, the additional information is provided alongside all the locations of the one or more in-house fuel cell apparatuses 102 that are displayed on the map of the display of the one or more user interfaces 310, 406. In some implementations, the fuel sharing platform 104 may provide a recommended price to one or more operators of an in-house fuel cell apparatus 102 based on the price of other operators of in-house fuel cell apparatuses 102 within a certain threshold distance. The recommended price may be further based on the cost of the fuel source and/or energy source. The fuel sharing platform 104 may also adjust the listed price of the fuel for the in-house fuel cell apparatus 102 using dynamic pricing that is based on the price of other operators and/or the fuel source and/or energy source, such as the cost of the fuel source and/or the cost of the energy source.

Figure 6:
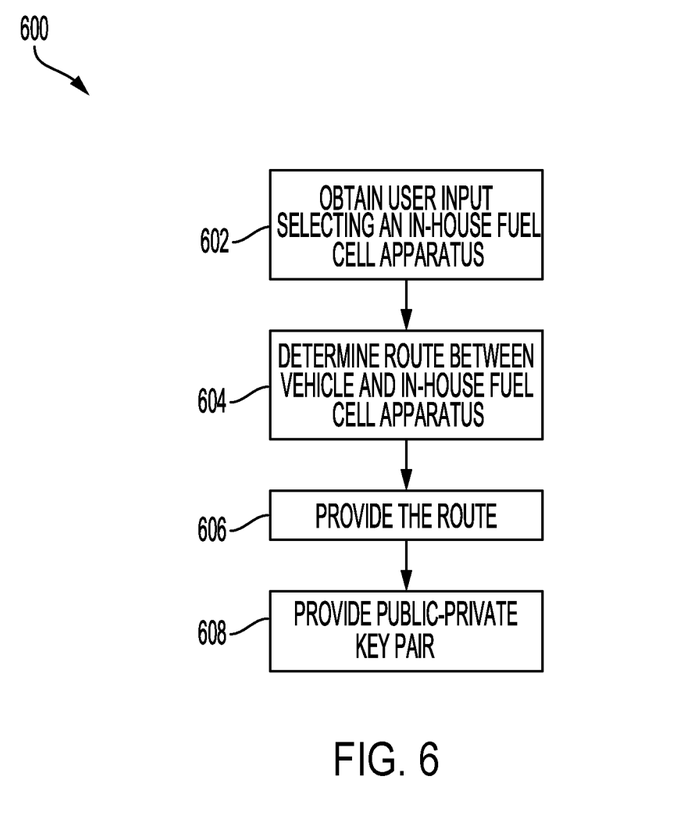
FIG. 6 is a flow diagram of an example process for facilitating connection of the one or more vehicles and the corresponding in-house fuel cell apparatus using the energy or fuel sharing network system of FIG. 1 according to an aspect of the invention.

FIG. 6 is a flow diagram of a process 600 for facilitating connection of the one or more vehicles 106 and the corresponding in-house fuel cell apparatus 102. One or more computers or one or more data processing apparatuses, for example, the processor 112 of the fuel sharing platform 104, the ECU 302 of the vehicle 106 and/or the processor 402 of the user device 108 of the fuel sharing network 100, appropriately programmed, may implement the process 600.

Once the fuel sharing platform 104 has provided the locations of the one or more in-house fuel cell apparatuses 102 that are available to the one or more user devices 108 and/or the one or more vehicles 106, the fuel sharing network 100 may receive or obtain user input that selects an in-house fuel cell apparatus 102 (602). The fuel sharing network 100 may obtain the user input via the one or more user interfaces 310, 406. The user input may be a selection or other indication of the in-house fuel cell apparatus 102 that the user desires to refuel or charge from. For example, the user may tap on a map that is displayed to show the locations of the one or more in-house fuel cell apparatuses 102.

The fuel sharing network 100 may determine or select the in-house fuel cell apparatus 102 (603). The fuel sharing network 100 may determine or select the in-house fuel cell apparatus 102 to recharge or refill the vehicle 106 based on the user input. The fuel sharing network 100 extract the indication of the user-desired in-house fuel cell apparatus 102 and use the user-desired in-house fuel cell apparatus 102 as the determined or selected in-house fuel cell apparatus 102. In some implementations, the fuel sharing platform 104 automatically selects or determines the in-house fuel cell apparatus 102 to refuel the vehicle 106 at. For example, the fuel sharing platform 104 may automatically select the nearest or closest in-house fuel cell apparatus 102 that is available based on the distance between the in-house fuel cell apparatus 102 and the vehicle 106. The fuel sharing platform 104 may select an in-house fuel cell apparatus 102 that has and provides the required type of fuel to fill the vehicle 106. The fuel sharing platform 104 may use other criteria, such as the amount of remaining fuel, the type of fuel or other criteria to select or determine the in-house fuel cell apparatus 102 to utilize. For example, the fuel sharing network 100 may calculate an estimation of the amount of fuel that is remaining at each of the one or more in-house fuel cell apparatuses 102. The estimation of the amount of fuel that is remaining may be a calculated amount based on the amount of fuel that is remaining, an estimated amount that an owner of the in-house apparatus may use for that day and an estimated generation amount. For example, the estimated amount of fuel remaining may be calculated as follows: Estimated Amount of Remaining Fuel=Remaining Fuel−Estimated amount of fuel that an owner's vehicle uses on that day+Estimated amount of fuel generated before the owner's vehicle returns. This ensures that the owner's vehicle may be filled by the in-house apparatus even if the fuel is being provided to other vehicles.

Once the in-house fuel cell apparatus 102 is determined or selected to fuel or charge the vehicle 106, the fuel sharing network 100 may determine a route between the vehicle 106 and the in-house fuel cell apparatus 102 (604). The fuel sharing network 100 may determine the route based on a current location of the vehicle 106 and the location of the selected or determined in-house fuel cell apparatus 102. One of the navigation units 308, 410 may obtain navigation map information that includes the current location of the vehicle 106 or user device 108. The current location of the vehicle 106 and/or user device 108 may be extracted from the navigational map information. The navigation unit 308, 410 may use the current location of the vehicle 106 and/or user device 108 as the starting location and the location of the selected or determined in-house fuel cell apparatus 102 as the destination location and determine the route between the starting location and the destination location. In some implementations, the fuel sharing platform 104 determines the route between the current location of the vehicle 106 and/or the user device 108 and the location of the in-house fuel cell apparatus 102.

Figure 8:
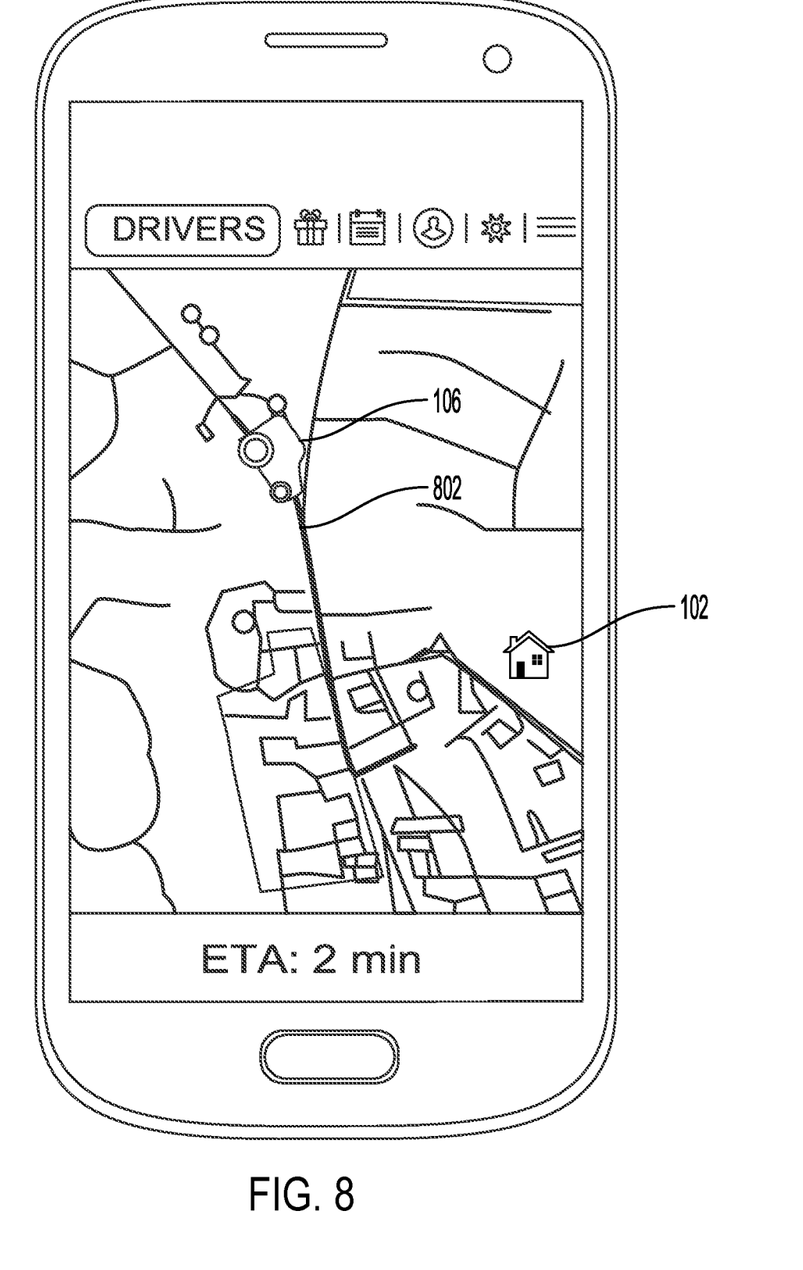
FIG. 8 shows an example user device that displays a map of the locations of one or more in-house fuel cell apparatuses using the energy or fuel sharing network system of FIG. 1 according to an aspect of the invention.

Once the route is determined, the fuel sharing network 100 provides the route to the one or more vehicles 106 and/or user device 108 (606). The route may be provided and shown on a map of a display of a user interface 310, 406. For example, the route 802 between the vehicle 106 and the in-house fuel cell apparatus 102 is shown in FIG. 8, for example. This facilitates navigation of the vehicle 106 to the in-house fuel cell apparatus 102 so that the vehicle 106 may refuel.

Once the in-house fuel cell apparatus 102 is selected or determined, the fuel sharing network 100 provides the public-private key pair associated with the selected or determined in-house fuel cell apparatus 102 and/or the vehicle 106 that is to refuel at the in-house fuel cell apparatus 102 (608). The fuel sharing platform 104 may associate the selected or determined in-house fuel cell apparatus 102 and the vehicle 106 with a corresponding public-private key pair and provide the public-private key pair to the vehicle 106 and/or the in-house fuel cell apparatus 102.

The fuel sharing platform 104 may provide the public key to the vehicle 106 or the in-house fuel cell apparatus 102, and the private key may have been previously stored in the other of the vehicle 106 or the in-house fuel cell apparatus 102 so that the vehicle 106 and in-house fuel cell apparatus 102 may securely authenticate and communicate with each other using digital key authentication. The public key may be used to send encrypted messages and the private key may be used to decrypt the encrypted messages when the vehicle 106 couples with the in-house fuel cell apparatus 102.

Figure 7:
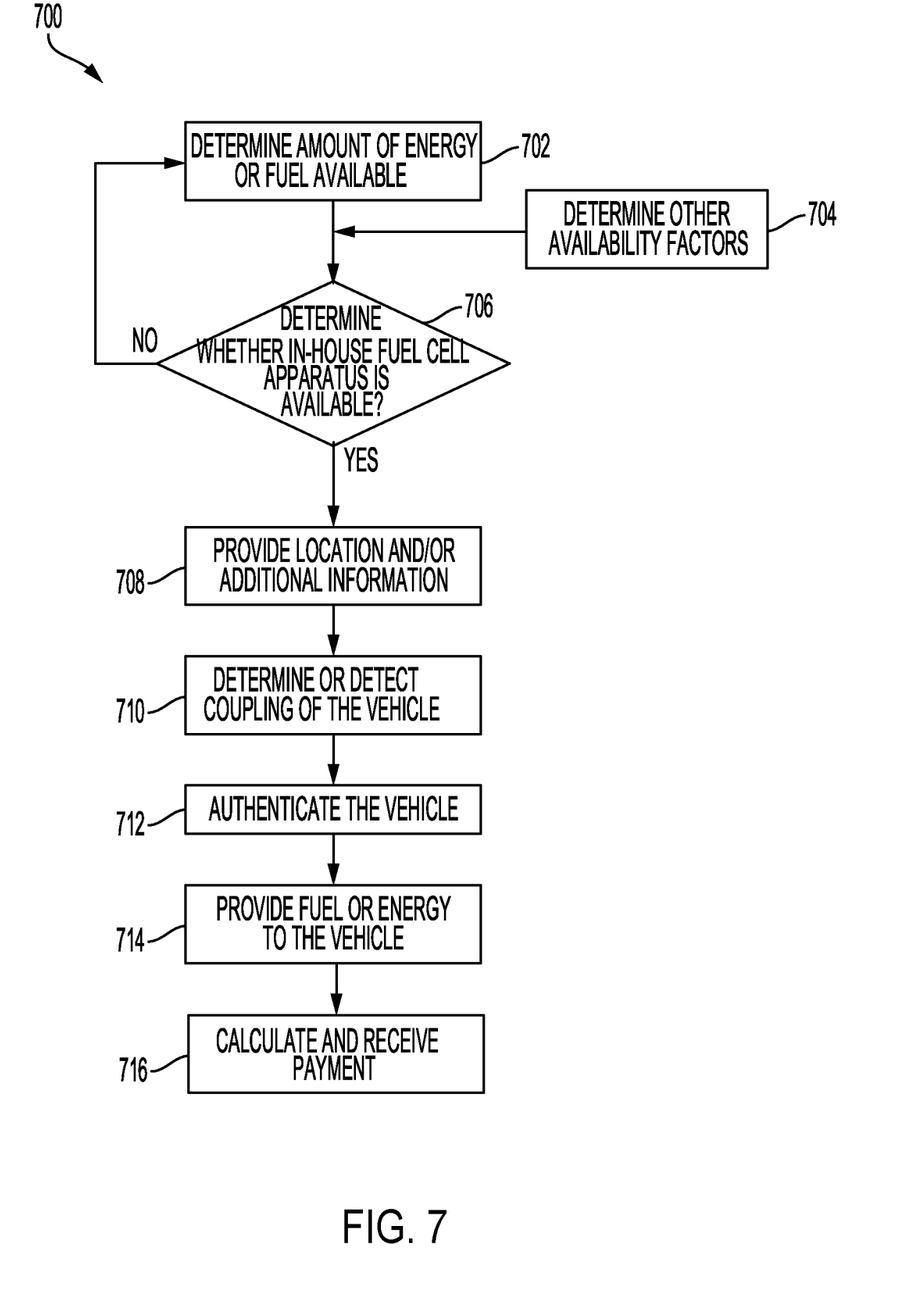
FIG. 7 is a flow diagram of an example process for providing or delivering fuel or energy to the vehicle when the vehicle connects or couples to the in-house fuel cell apparatus using the energy or fuel sharing network system of FIG. 1 according to an aspect of the invention.

FIG. 7 is a flow diagram of a process 700 for providing or delivering fuel or energy to the vehicle 106 when the vehicle 106 connects or couples to the in-house fuel cell apparatus 102. One or more computers or one or more data processing apparatuses, for example, the processor 112 of the fuel sharing platform 104, the ECU 302 of the vehicle 106 and/or the processor 402 of the user device 108 of the fuel sharing network 100, appropriately programmed, may implement the process 700.

The fuel sharing network 100 may determine the amount of energy or fuel available (702). The in-house fuel cell apparatus 102 may measure, detect or otherwise determine the amount of fuel or energy available to be provided to the one or more vehicles 106. The generation and distribution unit 204 of the in-house fuel cell apparatus 102 may have one or more sensors 212. The one or more sensors 212 may detect or measure the amount of energy or fuel that is available. When the generation and distribution unit 204 is an electrical charging station, the one or more sensors 212 may detect or measure the amount of electrical energy that is stored in a battery or being provided by a power source. Whereas, when the generation and distribution unit 204 is a hydrogen gas generation and distribution unit, the one or more sensors 212 may measure the amount of hydrogen gas in the fuel tank 214.

The fuel sharing network 100 may determine one or more other availability factors (704). The one or more availability factors may include an indication of whether a vehicle 106 is already coupled to the in-house fuel cell apparatus 102, such as an outlet 220 of the generation and distribution unit 204. One or more sensors 212 may detect whether there is a vehicle 106 that is coupled to the outlet 220 and provide an indication that the in-house fuel cell apparatus 102 may be unavailable if the in-house fuel cell apparatus 102 is currently in use. In some implementations, the in-house fuel cell apparatus 102 may detect or predict when a vehicle 106 that is coupled to the generation and distribution unit 204 will be finished refueling or recharging. The in-house fuel cell apparatus 102 may communicate with the vehicle 106 to detect or predict when the vehicle 106 that is coupled to the generation and distribution unit 204 will be finished refueling or recharging and provide the indication of when the vehicle 106 will be finished refueling or recharging as one of the availability factors.

The fuel sharing network 100 determines whether the in-house fuel cell apparatus 102 is available (706). The in-house fuel cell apparatus 102 may determine whether the in-house fuel cell apparatus 102 is available based on the one or more other availability factors and/or the amount of energy or fuel available. The in-house fuel cell apparatus 102 may indicate that the in-house fuel cell apparatus 102 is unavailable when the amount of energy or fuel available is less than a threshold amount. The in-house fuel cell apparatus 102 may also indicate that the in-house fuel cell apparatus 102 is unavailable when there is an indication that a vehicle 106 is already coupled to the in-house fuel cell apparatus 102 or when the in-house fuel cell apparatus 102 predicts or determines that the vehicle 106 will be finished refueling or recharging after a threshold amount of time, which indicates that the vehicle 106 will remain coupled to the in-house fuel cell apparatus 102 for at least a threshold amount of time. The threshold amount of time may be, for example, user-configured or the time required for the current vehicle 106 to reach the in-house fuel cell apparatus 102.

Otherwise, the in-house fuel cell apparatus 102 may indicate that the in-house fuel cell apparatus 102 is available when the amount of energy or fuel is greater than or equal to the threshold amount and/or when there is no vehicle 106 coupled to or attached to the in-house fuel cell apparatus 102. The in-house fuel cell apparatus 102 may indicate that the in-house fuel cell apparatus 102 is available when the in-house fuel cell apparatus 102 predicts or determines that a vehicle 106 that is currently attached or connected to the in-house fuel cell apparatus 102 will be finished refueling or recharging before the threshold amount time.

When the in-house fuel cell apparatus 102 is unavailable, the in-house fuel cell apparatus 102 may continue to check or determine the amount of energy or fuel available by the in-house fuel cell apparatus 102 and/or the other availability factors (702). In some implementations, the in-house fuel cell apparatus 102 may provide an indication to the fuel sharing platform 104 and/or to the other devices and/or entities within the fuel sharing network 100 that indicates that the in-house fuel cell apparatus 102 is unavailable.

Otherwise, when the in-house fuel cell apparatus 102 is available, the in-house fuel cell apparatus 102 provides the location of the in-house fuel cell apparatus 102 and/or additional information, as described above (708). The additional information may include the availability of the in-house fuel cell apparatus 102, the amount of fuel or energy available at the in-house fuel cell apparatus 102, the type or kind of fuel or energy that is provided, the price of the fuel or energy and/or other additional information, as described above. The in-house fuel cell apparatus 102 may provide the location of the in-house fuel cell apparatus 102 and/or additional information to the fuel sharing platform 104 to be provided to the one or more vehicles 106 and/or to the one or more user devices 108. In some implementations, the in-house fuel cell apparatus 102 may provide the location of the in-house fuel cell apparatus 102 and/or the additional information directly to the one or more vehicles 106 and/or to the one or more user devices 108 when the one or more vehicles 106 and/or the one or more user devices 108 are within a threshold distance of the in-house fuel cell apparatus 102.

The fuel sharing network 100 determines or detects the coupling of the vehicle 106 to the in-house fuel cell apparatus 102 (710). The in-house fuel cell apparatus 102 may have one or more sensors 212 that are coupled to the fuel tank 214 or the outlet 220 that indicate when a vehicle 106 is coupled to the in-house fuel cell apparatus 102. For example, the one or more sensors 212 may detect when the vehicle 106 is physically coupled to the outlet 220 or when fuel or energy is being provided from the fuel tank 214 or is being drawn from the fuel tank 214.

Once the fuel sharing network 100 determines or detects that the vehicle 106 is coupled to the in-house fuel cell apparatus 102, the fuel sharing network 100 may facilitate authentication of the vehicle 106 with the in-house fuel cell apparatus 102 and/or the in-house fuel cell apparatus 102 with the vehicle 106 (712). The fuel sharing network 100 may use digital authentication, such as public key authentication, to authenticate the vehicle 106 with the in-house fuel cell apparatus 102 or vice versa. In order to authenticate the vehicle 106, the fuel sharing platform 104 may have previously provided a public key that is associated with the vehicle 106 to the in-house fuel cell apparatus 102 when a user of the vehicle 106 selected the corresponding in-house fuel cell apparatus 102. The in-house fuel cell apparatus 102 may encrypt an authentication request using the public key, and in response, anticipate a digitally signed response by the vehicle 106 signed using the private key to authenticate the vehicle 106 with the in-house fuel cell apparatus 102. When the in-house fuel cell apparatus 102 receives and verifies the digitally signed response, the in-house fuel cell apparatus 102 may allow the vehicle 106 to connect to the in-house fuel cell apparatus 102. Similarly, the vehicle 106 may encrypt an authentication requesting using another public key, and in response, anticipate a digitally signed response by the in-house fuel cell apparatus 102 signed using a corresponding private key to authenticate the in-house fuel cell apparatus 102 with the vehicle 106. When the vehicle 106 receives and verifies the digitally signed response, the vehicle 106 may allow the in-house fuel cell apparatus 102 to connect to the vehicle 106. For example, each party, such as the vehicle 106 and the in-house fuel cell apparatus 102, may generate a public-private key pair and have the public key distributed. The two parties may then compute a shared-secret, which may be used to communicate with each other, such as in a Diffie-Hellman key exchange.

Once the vehicle 106 is authenticated with the in-house fuel cell apparatus 102 and/or the in-house fuel cell apparatus 102 is authenticated with the vehicle 106, the in-house fuel cell apparatus 102 provides the fuel or energy to the vehicle 106 (714). The generation and distribution unit 204 may activate a pump to pump the fuel from the fuel tank 214 and out the outlet 220 into the vehicle 106. In some implementations, the generation and distribution unit 204 may discharge electrical energy through the outlet 220 to charge the vehicle 106.

The fuel sharing network 100 may calculate and receive payment (716). The in-house fuel cell apparatus 102 may detect the amount of fuel or energy provided and calculate the payment required based on the detected amount of fuel or energy provided. The in-house fuel cell apparatus 102 and/or the fuel sharing platform 104 may request and receive payment from the one or more user devices 108 and/or the one or more vehicles 106. Payment information may be inputted via the one or more user interfaces 310, 406 and be associated with the vehicle 106 that is coupled to the in-house fuel cell apparatus 102. The payment information may be provided to the in-house fuel cell apparatus 102 or the fuel sharing platform 104 to process the payment amount to the payment method included within the payment information.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fuel sharing network system, comprising:
    a first in-house fuel cell apparatus configured to be coupled or included within a home and including:
        a fuel tank configured to store fuel; and
        a generation and distribution unit that is configured to:
            generate the fuel and transfer the fuel to the fuel tank,
            provide the fuel to a vehicle, and
            determine an amount of fuel available in the fuel tank based on an actual amount of fuel that is currently present in the fuel tank and an estimated amount of fuel that an owner of the first in-house fuel cell apparatus is expected to use; and
    a fuel sharing platform having a processor configured to:
        determine a first location of the first in-house fuel cell apparatus,
        receive an availability of the first in-house fuel cell apparatus from the generation and distribution unit based on the amount of fuel available in the fuel tank, and
        provide the first location and the availability of the first in-house fuel cell apparatus to the vehicle or a user device.

2. The fuel sharing network system of claim 1, wherein the generation and distribution unit is a hydrogen gas generation and distribution unit that is configured to generate hydrogen gas and provide the hydrogen gas to the vehicle, wherein the first in-house fuel cell apparatus has a power source including at least one of a solar panel or an electrical source and a fuel source including at least one of a water source or a natural gas source, wherein the hydrogen gas generation and distribution unit is configured to convert the water source or the natural gas source to the hydrogen gas using electrical energy from the power source.

3. The fuel sharing network system of claim 1, wherein the processor is further configured to:
    determine a second location of a second in-house fuel cell apparatus; and
    provide the second location of the second in-house fuel cell apparatus to the vehicle or the user device.

4. The fuel sharing network system of claim 1, wherein the generation and distribution unit is further configured to:
    determine that the vehicle is coupled to the generation and distribution unit;
    authenticate the vehicle using digital key authentication; and
    provide the fuel to the vehicle in response to the vehicle being authenticated.

5. The fuel sharing network system of claim 4, wherein to authenticate the vehicle using digital key authentication the generation and distribution unit is configured to use public key cryptography to authenticate the vehicle to the generation and distribution unit.

6. The fuel sharing network system of claim 1,
    wherein the step of determining
        an amount of fuel available in the fuel tank is further based on an estimated generation amount of fuel for that day.

7. The fuel sharing network system of claim 1, wherein the processor of the fuel sharing platform is further configured to:
    obtain a current location of the vehicle; and
    provide a route from the current location of the vehicle to the first location of the first in-house fuel cell apparatus to the vehicle or the user device.

8. The fuel sharing network system of claim 1, further comprising:
    at least one of a plurality of user devices that include the user device or a plurality of vehicles that include the vehicle, wherein the at least one of the plurality of user device or the plurality of vehicles are configured to:
        receive a plurality of locations of in-house fuel cell apparatuses that include the first location of the first in-house fuel cell apparatus;
        display the plurality of locations of the in-house fuel cell apparatuses on a map;
        provide an availability for each of the in-house fuel cell apparatuses; and
        provide a price for one or more of the in-house fuel cell apparatuses.

9. A hydrogen sharing platform including:
    a memory configured to store a location for each of a plurality of in-house fuel cell apparatuses each having a fuel tank configured to store hydrogen gas and a hydrogen gas generation and distribution unit that is configured to:
        generate the hydrogen gas and transfer the hydrogen gas to the fuel tank, and
        provide the hydrogen gas to a vehicle; and
    a processor coupled to the memory and configured to:
        determine the location of each of the plurality of in-house fuel cell apparatuses,
        receive an availability for each of the plurality of in-house fuel cell apparatuses from the hydrogen gas generation and distribution unit based on an actual amount of hydrogen gas that is currently present in the fuel tank and an estimated amount of hydrogen gas that an owner of one of the plurality of in-house fuel cell apparatuses is expected to use, and provide the location and availability for each of the plurality of in-house fuel cell apparatuses to a user device or the vehicle.

10. The hydrogen sharing platform of claim 9, wherein the processor is further configured to:
   obtain a current location of the vehicle or the user device; and
   determine the location of each of the plurality of in-house fuel cell apparatuses based on the current location.

11. The hydrogen sharing platform of claim 9, wherein the processor is further configured to:
   obtain a current location of the vehicle; and
   provide a route from the current location of the vehicle to the location of one of plurality of in-house fuel cell apparatuses to the vehicle.

12. The hydrogen sharing platform of claim 9, wherein the processor is further configured to:
   determine a price for each of the plurality of in-house fuel cell apparatuses; and
   provide the price for each of the plurality of in-house fuel cell apparatuses to the user device or the vehicle.

13. The hydrogen sharing platform of claim 9, wherein each in-house fuel cell apparatus of the plurality of in-house fuel cell apparatuses has a power source including at least one of a solar panel or an electrical source and an energy source including at least one of a water source or a natural gas source, wherein the hydrogen gas generation and distribution unit is configured to convert the energy source to hydrogen gas using electrical energy from the power source.

\* \* \* \* \*